US006224120B1

United States Patent
Eipper et al.

(10) Patent No.: US 6,224,120 B1
(45) Date of Patent: May 1, 2001

(54) ARRANGEMENT OF A FRONT PROTECTION BOW ON A MOTOR VEHICLE FRONT END

(75) Inventors: Konrad Eipper, Rottenburg; Matthias Schefzuk, Tubin, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/441,372

(22) Filed: Nov. 17, 1999

(30) Foreign Application Priority Data

Nov. 17, 1998 (DE) .............................................. 198 52 959

(51) Int. Cl.[7] .................................................. B60R 19/38
(52) U.S. Cl. ........................ 293/118; 293/119; 293/132; 293/115
(58) Field of Search ............................... 293/24, 26, 107, 293/108, 115, 116, 118, 119, 134, 135, 136, 137, 132

(56) References Cited

U.S. PATENT DOCUMENTS

| 2,329,874 | | 9/1943 | Cadwallader et al. | |
|---|---|---|---|---|
| 5,215,343 | * | 6/1993 | Fortune | 293/115 X |
| 5,242,157 | * | 9/1993 | Bonenberger et al. | 293/134 X |
| 5,370,429 | * | 12/1994 | Reuber et al. | 293/119 X |
| 5,967,573 | * | 10/1999 | Wang | 293/119 |
| 6,022,057 | * | 2/2000 | Vermeulen | 293/137 X |
| 6,152,504 | * | 11/2000 | Dickson et al. | 293/115 |

FOREIGN PATENT DOCUMENTS

WO 96/20852  7/1996  (WO).

* cited by examiner

Primary Examiner—D. Glenn Dayoan
Assistant Examiner—Jason Morrow
(74) Attorney, Agent, or Firm—Evenson, McKeown, Edwards & Lenahan, P.L.L.C.

(57) ABSTRACT

A front protection bow on a motor vehicle front end is supported by bending-resistant rod profiles on supporting components of the motor vehicle body. The rod profiles of the front protection bow, which together are closed to form a frame and which are largely situated in the overlapping area with the motor vehicle front end comprising a forward front wall and an elastically flexible bumper, extend at least along a predominant portion of the width and the height of the motor vehicle front end. The front wall of the motor vehicle front end has a front end contour which is adapted to the course or curve of the frame and which has at least one section which is embedded in the front wall and in which at least one rod profile of the frame is to be arranged in a sunk manner at least by a partial cross-section. The frame of the front protection bow, when the rod profile is lowered, is arranged to be offset toward the rear with respect to the forward side of the bumper.

8 Claims, 5 Drawing Sheets

ARRANGEMENT OF A FRONT PROTECTION BOW ON A MOTOR VEHICLE FRONT END

BACKGROUND OF THE INVENTION

This application claims priority of DE 198 52 959.7-21, filed on Nov. 17, 1998, the disclosure of which is expressly incorporated by reference herein.

The present invention relates to an arrangement of a front protection bow on a motor vehicle front end, and more particularly, to an arrangement which is supported by bending-resistant rod profiles on supporting components of the motor vehicle body. The rod profiles of the front protection bow, which together are closed to form a frame and which are largely situated in the overlapping area with the motor vehicle front end comprising a forward front wall and an elastically flexible bumper, extend at least along a predominant portion of the width and the height of the motor vehicle front end.

A known arrangement of a front protection bow is described in WO 96/20852 A1. This conventional front protection bow has bending-resistant rod profiles which are braced in a framework-type manner to form a closed frame and can be fastened on supporting components of the motor vehicle body. The front protection bow is situated in the overlapping area of the motor vehicle front end and extends at least along a predominant portion of its width and height. In addition, the front protection bow which forms the forward outer contour of the vehicle—is arranged at a distance in front of a forward front wall of the motor vehicle front end. By way of two frame parts, the front protection bow reaches over a forward, elastically flexible bumper so that the function of the bumper situated behind the frame parts is impaired.

Another disadvantage of the known arrangement of the front protection bow is that, even in the event of minor parking pushes, damage may be caused on the vehicle itself or on other participating vehicles, particularly if the front protection bow projects toward the front over the bumper and forms the forward vehicle contour. In the event of frontal accidents involving persons, a frame arranged at a larger distance in front of the frontal area of the vehicle front end may represent an increased risk of injury to the person hit. In addition, such front protection bows may impair the aerodynamic shape of a motor vehicle and therefore cause a higher fuel consumption.

SUMMARY OF THE INVENTION

An object of the present invention is to provide an arrangement of a front protection bow on a motor vehicle front end by which the features in the event of accidents involving persons or vehicles as well as the aerodynamic design of the motor vehicle can be further improved.

In the arrangement of the front protection bow according to the invention, the object has been achieved by providing that the front wall of the motor vehicle front end has a front end contour which is adapted to the frame and has a section embedded in the front end contour in which at least one rod profile of the frame can be placed in a sunk manner at least with one partial cross-section. In the this lowered arrangement of the rod profile, the frame is displaced toward the rear with respect to the front side of the bumper. As a result, the frame of the front protection bow can now be positioned from the position known so far, thus arranged at a distance in front of the front wall of the motor vehicle front end, into a position close to the front wall adapted thereto in a set-back manner.

Depending on the further development and the shape of the front protection bow and of the motor vehicle front end, either one or several rod profiles of the frame or the entire frame can be arranged to be sunk in the embedded section of the front wall. Thereby, when the complete frame is received, the section can be constructed as a negative form for this frame. Because rod profiles of the most different closed or open cross-sections can be used, such as tube profiles, oval or elliptical profiles, C-profiles, L-profiles or U-profiles, the channels of the section embedded in the front wall can be correspondingly adapted. In this case, the rod profiles can be arranged to be sunk into the channels of the embedded section by a partial cross-section or completely.

With this novel arrangement of the front protection bow on the motor vehicle front end, the reversible buffering effect of the bumper is maintained in a normal manner without action upon the front protection bow. Thereby, the operating friendliness of the vehicle during parking into narrow parking spaces is increased or, in the event of a push or a minor frontal impact, damage to the own or to other involved vehicles can be avoided. In this case, the frame can also be arranged in a sunk manner in recesses of the bumper, whereby the front protection bow can be situated only above as well as above and below the bumper.

If the frame projects slightly over the front wall of the motor vehicle front end, despite the arrangement displaced toward the rear, the front protection bow will have the known advantages of protecting the motor vehicle front end, particularly during cross-country driving, from the effects of blows, for example, caused by branches.

As a result of the pulled-back position of the frame, a front protection bow is created which represents a clearly reduced risk of injury in the event of frontal accidents involving persons. A front protection bow is particularly useful where the frame is situated approximately in one area with the front wall.

Also, in a frame which extends far upward approximately to the level of the engine hood, a driving below obstacles, particularly trucks, is more avoidable. Overall, as a result of the frame extending over a predominant portion of the height and the width of the motor vehicle front end, an improved accident behavior of the motor vehicle is achieved. In the event of a frontal collision with a slight overlapping of width, because of the front protection bow, the resulting forces can be distributed better along the entire width and height of the deformable zone of the motor vehicle and the forces can therefore clearly be absorbed better.

Finally, the arrangement of the front protection bow according to the present invention permits an aerodynamically developed motor vehicle front end which allows a reduction of the fuel consumption. In addition, the shaping of previously known front protection bows, which may be somewhat aggressive, is softened and a restrained shape of the front end is created.

Thus, a frame which is arranged completely above a bumper has been found to be particularly advantageous because the front protection bow can be integrated in a simple manner into the frontal area and develop its full protective effect.

A lower rod profile which extends approximately along the entire width and an approximately U-bow-shaped upper rod profile which is connected therewith and extends approximately to the level of the upper edge of the front end, together result in a frame which ensures the essential protective features of the front protection bow, can be manufactured and integrated into the front wall of the front end in a relatively simple manner.

If the motor vehicle front end is bounded laterally and upward by the frame which is also constructed as a framing for the headlights and the radiator grille, particularly the corner area between the frontal area and the lateral surfaces, which frames the headlights, is well protected from the effect of blows.

A basic frame, whose corner areas are arranged at two upper and two lower side members, provides a particularly good linkage of the front protection bow to the deformation zone of the motor vehicle. Consequently, the frame is particularly well suited for distributing and transmitting forces in the event of a frontal impact.

As a result of the arrangement of one crash box respectively between the lower corner areas of the basic frame and the lower side members, the energy which in the event of an accident acts upon the frame can be advantageously reduced. Since, according to experiences, the lower side members must absorb higher forces, the energy absorption elements are at least arranged there. In a particularly advantageous embodiment, these elements are provided between all corner areas and the assigned side members.

In an advantageous further development of the invention, the front protection bow can be moved from its lowered position, which is suitable, for example, for city driving or when driving on a turnpike, into a position displaced toward the front when increased protection is required. A front protection bow with the described advantages in the moved-in position, in the event of such a protection requirement, for example, during cross-country driving, has a still better protective effect.

Finally, it has been found to be particularly advantageous to configure the front protection bow such that, for example, in the event of a frontal impact, it can be moved into a position displaced toward the front when an approach sensing system is triggered. Thus, an extension of the deformation zone and a clearly improved accident behavior of the motor vehicle can be achieved in the event of a crash. Instead of the approach sensing system known per se, a speed-dependent or deceleration-dependent sensing system can also be used.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
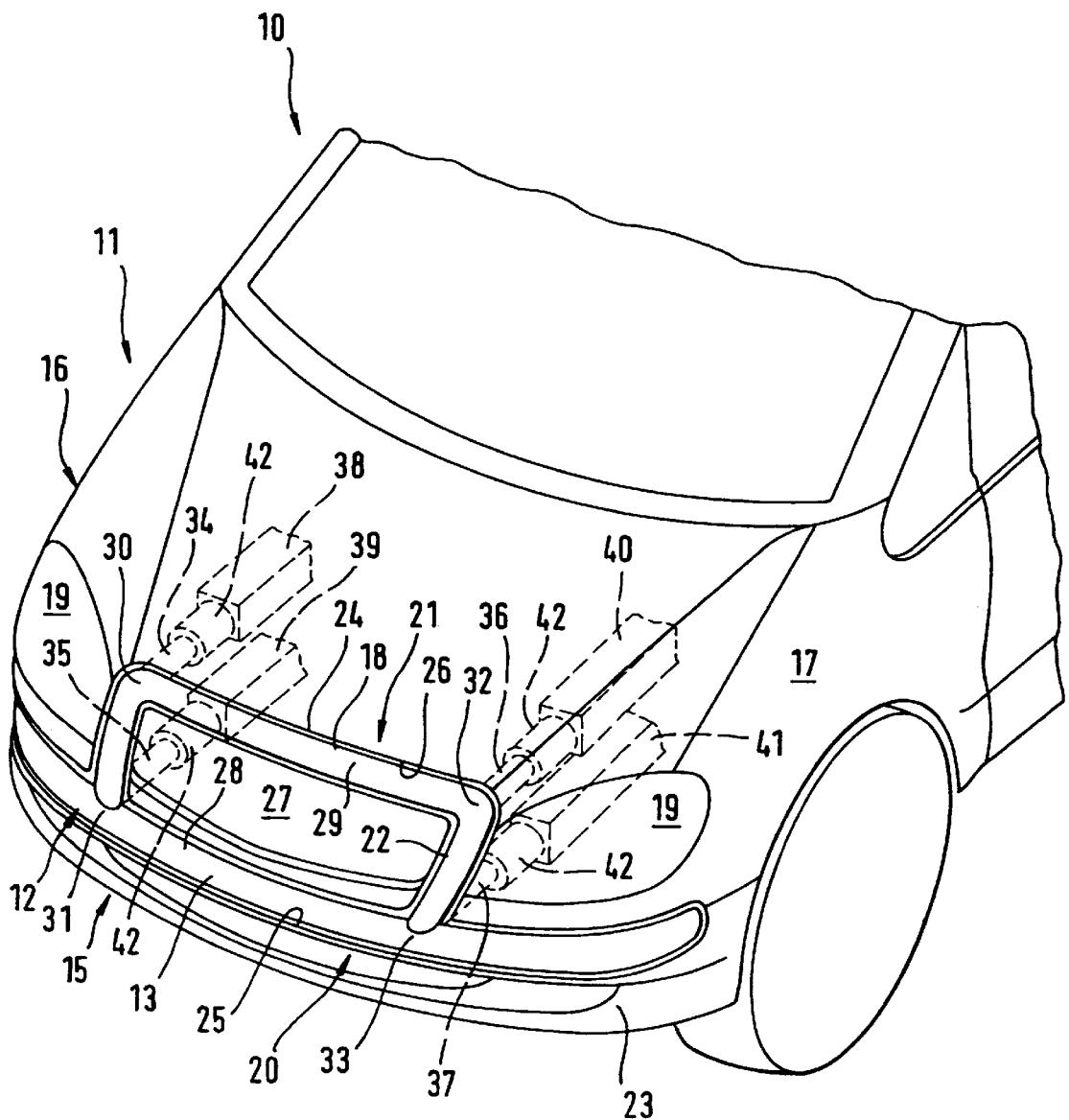
FIG. 1 is a perspective front view of a motor vehicle having a front protection bow arranged in a sunk position on a motor vehicle front end according to a first embodiment of the invention.

FIG. 1 is a perspective frontal view of a motor vehicle 10 with a front end protection bow 12 arranged at the motor vehicle front end 11. The front protection bow 12 has a lower rod profile 13 which extends approximately horizontally and in the transverse direction of the vehicle and which extends along the entire width of the motor vehicle 10 into the respective corner area between a forward front wall 15 and the forward end of side walls 16, 17. Furthermore, the front protection bow 12 comprises a U-bow-shaped upper rod profile 18 which is connected with the lower rod profile and which, starting from the lower rod profile 13, extends between two headlights 19 arranged laterally in the front wall 15 to approximately the level of an upper edge 21 of the front end formed in this area by an engine hood.

The two rod profiles 13, 18, which in this embodiment consist of special steel, are welded to one another in a closed manner to form a frame 22 which is situated in the overlapping area of the motor vehicle front end 11. Other connections as, for example, by way of screws or the like, which ensure a sufficient stability, are also conceivable. In addition, depending on the vehicle type, the front protection bow 12 can also consist of a plastic material with a corresponding bending stiffness, for example, of a fiberglass-reinforced plastic material or the like.

Figure 3:
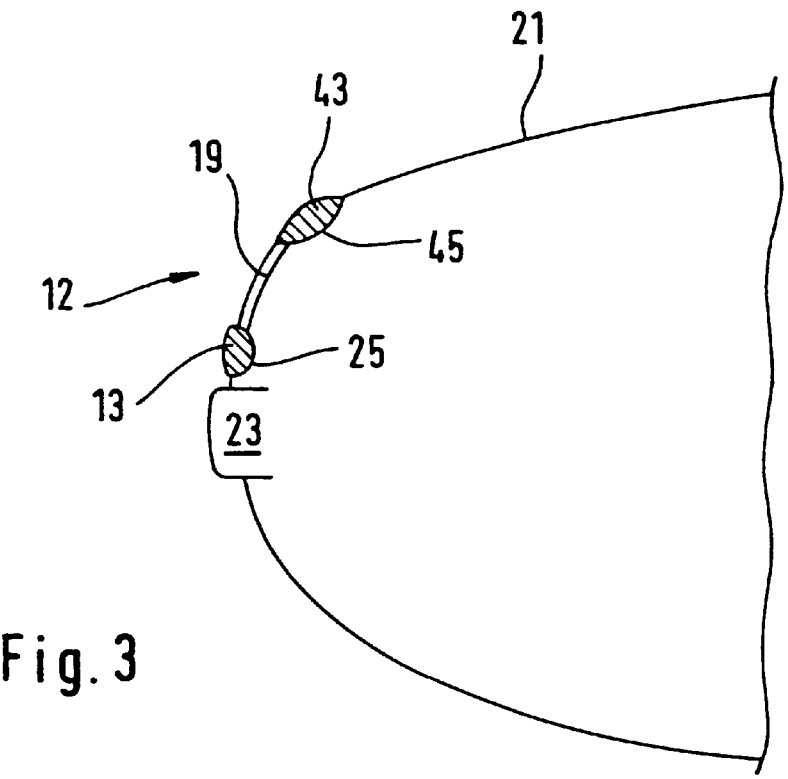
FIG. 3 is a schematic sectional view of the arrangement of the sunk front protection bow along line III—III in FIG. 2.
Figure 4:
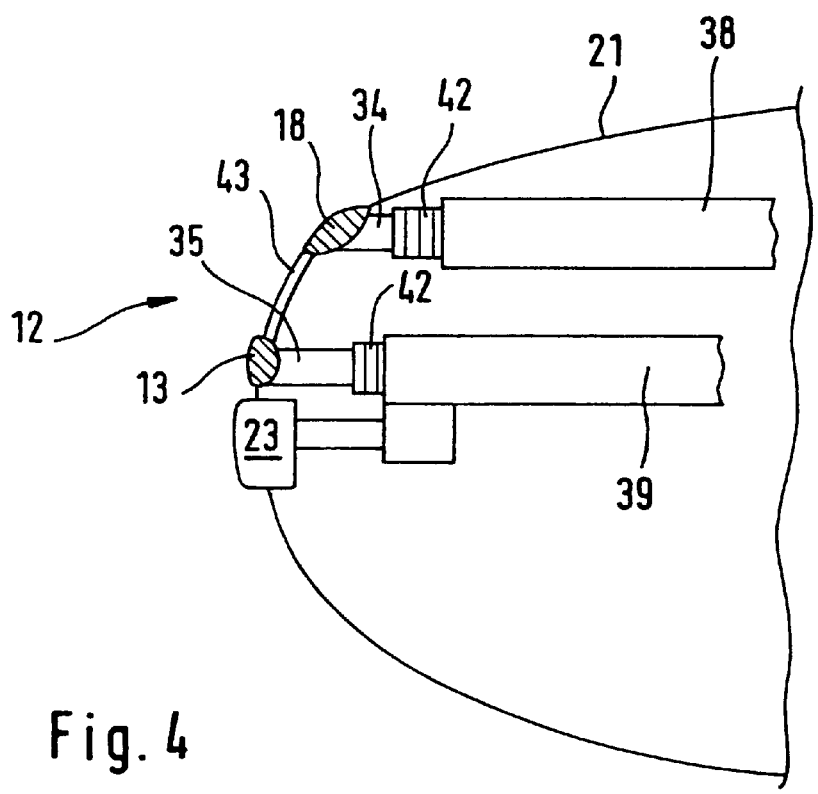
FIG. 4 is a schematic sectional view of the arrangement of the sunk front protection bow along line IV—IV in FIG. 2.

The front protection bow 12 as a whole is arranged above a bumper 23 which preferably extends approximately parallel to the lower rod profile 13, the bumper 23, as illustrated particularly in FIGS. 3 and 4, viewed from the front in the longitudinal direction of the vehicle, projecting over the front protection bow 12 by way of its forward side 20. The bumper 23 consists of a plastic material and, in a customary manner, is connected by known elastic intermediate elements with a forward cross member so that, at least to an impact speed of 4 km/h, the bumper has elastically flexible characteristics. The forward front wall 15 of the motor vehicle front end 11 has a front end contour which is adapted to the course or curve of the frame 22 and into which a section 24 is embedded in this embodiment.

In the section 24 the frame 22 of the front protection bow 12 is arranged in a sunk manner. In other words, the section 14 shaped into the front wall 15 is constructed as a negative shape in which the frame 22 is arranged in a sunk manner. A lower channel 25 or similar indentation which extends approximately horizontally in the transverse direction of the vehicle and is adapted to the lower rod profile 13, and an approximately U-bow-shaped upper channel 26 or similar recess connected with the lower channel 25 are shaped into the forward front wall 15 and form the section 24 in this embodiment.

The lower channel 25 is placed directly above the bumper 23 and below the headlights 19 or a radiator grille 27 into the front wall 15. The upper channel 26 is shaped in between the headlights 19, bounding the radiator grille 27 laterally and upward, also into the front wall 15. The further development of the frame 22 and its arrangement within the section 24 will be discussed particularly with reference to FIGS. 3 and 4.

The upper rod profile 18 and a center rod section 28 of the lower frame profile 13 form an approximately rectangular basic frame 29, whose corner areas 30–33 are supported by bending-resistant additional rod profiles 34–37 (outlined by dashed lines), on two upper and two lower side members 38–41 of the motor vehicle body which are also shown by broken lines.

In the illustrated embodiment, the additional rod profiles 34–37 consist of special steel tubes which are welded to the respective corner area 30–33 and extend approximately in the longitudinal direction of the vehicle. Naturally, it would also be within the scope of the present invention that the additional rod profiles 34–37 also consist of a plastic material and form a unit with the basic frame 29 by means of another detachable or undetachable connection. Likewise, it is contemplated to support the front protection bow 12 with the basic frame 29 without the use of the additional rod profiles 34–37 directly on the side members 38–41.

In the simplest embodiment, the front protection bow 12 can also be connected only with the two lower side members 39, 41 or to other supporting components of the motor vehicle body. The additional rod profiles 34–37 each comprise an energy absorption element (crash box 42) arranged between the corner areas 30–33 and the side members 38–41 and outlined by interrupted lines, which energy absorption element is disposed in front of the corresponding side member 38–41. In this embodiment, one crash box 42 can be provided respectively only between the two lower corner areas 32, 33 and the lower side members 40, 41.

Figure 2:
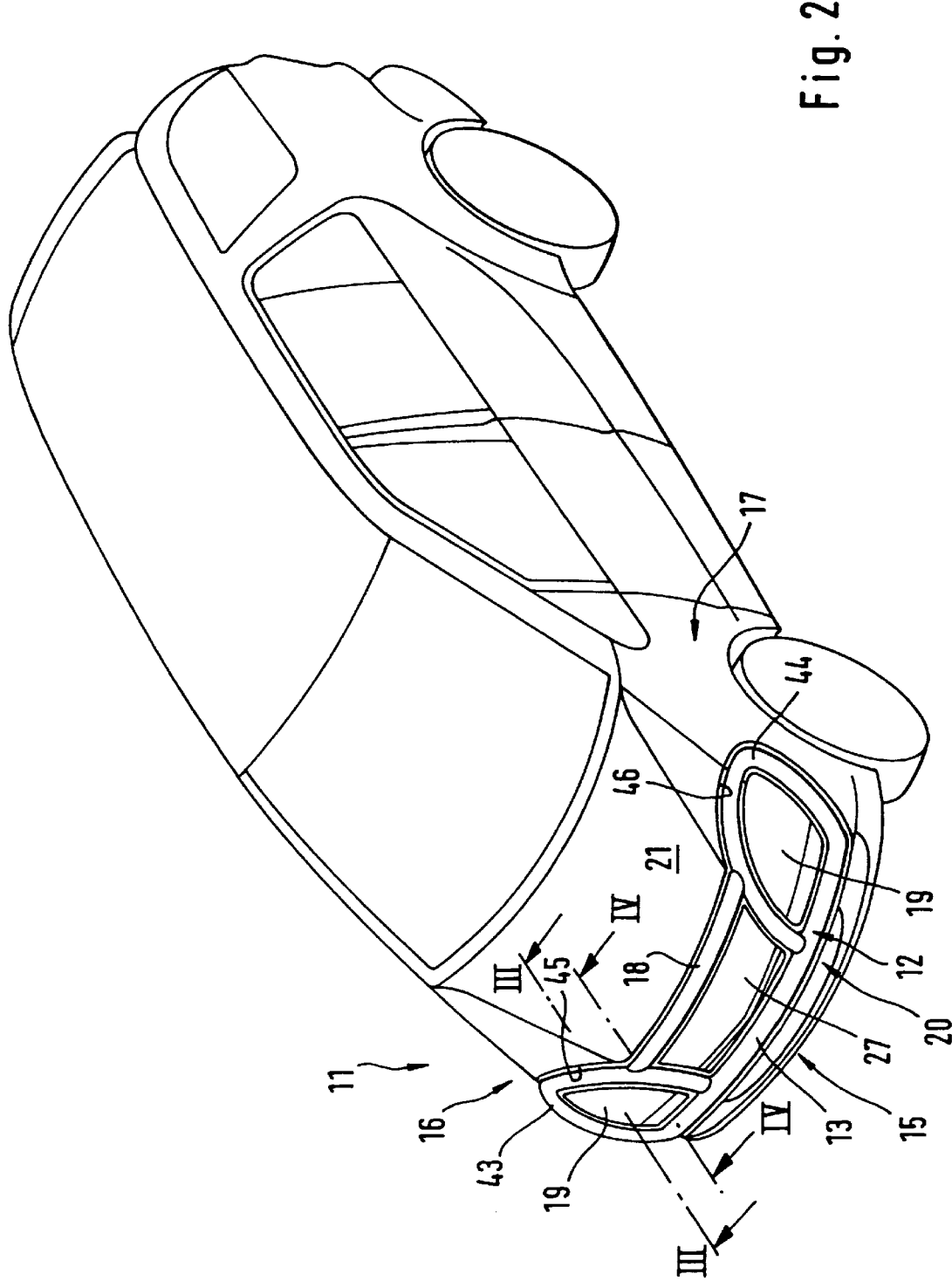
FIG. 2 is a perspective frontal view of the entire motor vehicle having the front protection bow arranged in a sunk position on the motor vehicle front end according to another embodiment of the invention.

FIG. 2 illustrates another front protection bow 12 which is arranged on the motor vehicle front end 11 and which, in addition to the lower horizontal and the upper U-bow-shaped rod profile 13, 18, includes lateral rod profiles 43, 44 which are constructed as a framing for the headlights 19 and bound the motor vehicle front end 11 laterally and upward. Correspondingly, the engine hood 21 ends behind the front protection bow 12. For the sunk receiving of the lateral rod profiles 43, 44 within the front wall 15, lateral channels 45, 46 are provided which are shaped in either in the corner area between the front wall 15 and the side walls 16, 17 or between the front wall 15 and the upper vehicle wall 21 into the front wall 15. The channels 25, 26, 45, 46 can also be shaped into the glass of the headlights 20 or into the radiator grille 27. The shape of the channels 25, 26, 45, 46 is particularly well illustrated in FIG. 5.

FIG. 3 is a schematic sectional view of the sunk front protection bow 12 along line III—III in FIG. 2. The lateral rod profile 43 is arranged in a sunk manner by a partial cross-section within the lateral channel 45. Here, the rod profiles 13, 18, 43, 44, each have an approximately elliptical cross-section which is adapted to an approximately semi-elliptical cross-section of the channels 25, 26, 45, 46. The rod profiles 13, 18, 43, 44 project slightly out of the channels 25, 26, 45, 46. Of course, the rod profiles 13, 18, 43, 44 can also have different closed or open cross-sections, for example, in a C-shape, U-shape, O-shape or L-shape, in which case the profiles may additionally also be covered by an elastic material. The frame 22 can also consist of a continuously identical profile or of a profile which differs in sections. Furthermore, the lower rod profile 13 is arranged directly above the bumper 23 as illustrated, and, viewed from the front in the longitudinal direction of the vehicle, the entire front protection bow 12 is situated behind the bumper 23.

A schematic sectional view of the sunk front protection bow 12 along line IV—IV in FIG. 2 and along the additional rod profiles 34, 35 is illustrated in FIG. 4. The arrangement of the energy absorption elements is visible at the end of the rod profiles 34, 35 and in front of the side members 38, 39. According to the vehicle type, it is contemplated, for example, to save space by eliminating an upper connection between the front protection bow 12 and the upper side member 38.

Figure 5:
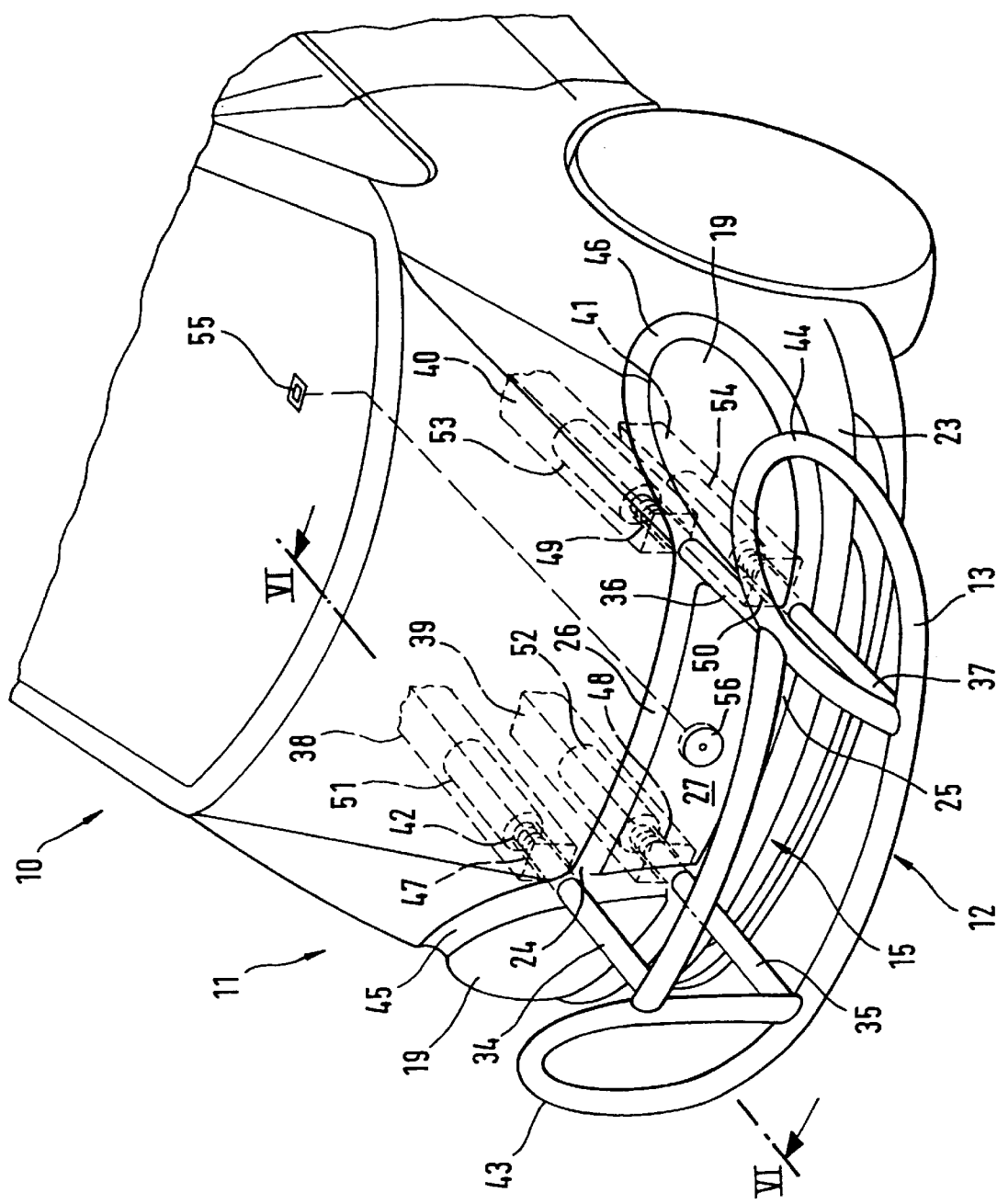
FIG. 5 is a perspective frontal view of the motor vehicle with the front protection bow according to FIG. 2 arranged in the moved-out position on the motor vehicle front end.

FIG. 5 is a perspective frontal view of the motor vehicle 10 with the front protection bow 12 shown in FIG. 2 but in the moved-out position. In this case, the section 24 with the channels 25, 26, 45 and 46 is shown as shaped into the front wall 15 and, in the area of he headlights 19, partially also into their glass and which corresponds as a negative shape to the front protection bow 12.

In order to arrange the front protection bow 12 displaceably on the motor vehicle body, the additional rod profiles 34–37 are guided by guides 47–50, such as additional tubes (shown by dashed lines), and are arranged inside the side members 38–41 outlined by dashed lines. For moving out the front protection bow 12, one pneumatic cylinder 51–54 respectively which is illustrated by a broken line is also fixed within the side members 38–41, the rod profiles 34–37 forming the respective piston rod of the cylinders 51–54. In this case, the cylinders 51–54 are fed by a gas storage device which is not shown.

Instead of being operable by pneumatic cylinders 51–54, the front protection bow 12 can be arranged to be moved out mechanically or hydraulically. The rod profile 34–37 again each comprise an energy absorption element 42 which is used for absorbing accident-generated energy.

For moving from its sunk position into the moved-out position, the front protection bow 12 can be controlled either by a switch 55 arranged preferably inside the vehicle occupant compartment by the driver or by an approach sensing system 56 which is arranged inside the motor vehicle front end 11.

Figure 6:
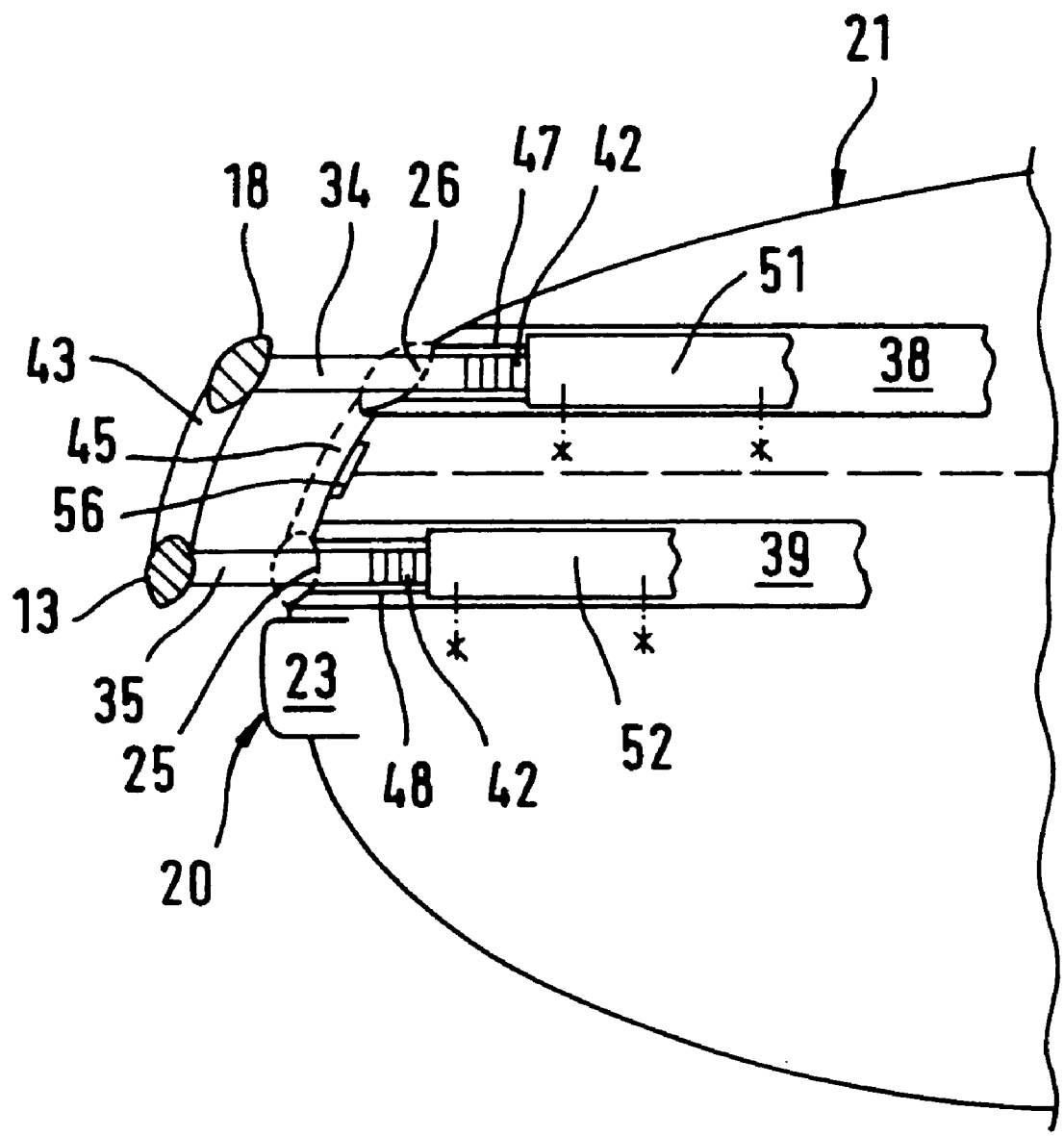
FIG. 6 is a schematic sectional view of the arrangement of the moved-out front protection bow along line VI—VI in FIG. 5.

FIG. 6 is a schematic sectional view of the arrangement of the moved-out front protection bow 12 along line VI—VI in FIG. 5. The moved-out front protection bow 12 can be locked in its moved-out position by a known locking device. Depending on the vehicle type and the requirements, the distance of the front protection bow 12 moved out toward the front can be varied. Within the scope of the invention, it would also be conceivable to configure the bumper 23 so that it can be moved out together with the front protection bow 12. Likewise, it can also be considered to be included that the lower rod profile 13 takes over the function of the forward cross members, whereby the bumper 23 can then also be arranged on the lower rod profile 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement of a front protection bow on a motor vehicle front end, comprising bending-resistant rod profiles on supporting components of a motor vehicle body for supporting the front end, wherein the rod profiles, which together are closed to form a frame and which are substantially situated in a overlapping area with the motor vehicle front end comprising a forward front wall and an elastically flexible bumper, extending at least along a predominant portion of a width and the height of the motor vehicle front end, the forward front wall of the motor vehicle front end has a front end contour adapted to a shape of the frame and which comprises at least one section embedded in the front wall and in which at least one of the rod profiles is to be arranged in a sunk manner at least by a partial cross-section, and the frame of in a lowered position of the rod profile, is offset toward a rear with respect to a forward side of the bumper.

2. The arrangement according to claim 1, wherein the frame is arranged above the bumper of the motor vehicle.

3. The arrangement according to claim 1, wherein the front protection bow comprises a lower rod profile extending approximately horizontally in a transverse vehicle direction and approximately over an entire width and as an upper rod profile connected therewith, is approximately U-bow-shaped and extends approximately to the level of an upper edge (21) of the front end.

4. The arrangement according to claim 1, wherein the motor vehicle front end is bounded laterally and upward by the front protection bow and is a framing for headlights and radiator grille.

5. The arrangement according to claim 1, wherein the front protection bow has an approximately rectangular basic frame with corner areas which are supported on two upper and two lower side members of the motor vehicle body.

6. The arrangement according to claim 5, wherein one energy absorption element respectively is arranged at least between the lower corner areas of the basic frame and the lower side members.

7. The arrangement according to claim 1, wherein the front protection bow is movable out into a position frontwardly displaceable for increased protection.

8. The arrangement according to claim 1, wherein the front protection bow is movable out into a position frontwardly displaceable with control by an approach sensing system.

* * * * *